United States Patent
Ito

(10) Patent No.: US 10,549,454 B2
(45) Date of Patent: Feb. 4, 2020

(54) SEPARATION DEVICE AND METHOD FOR MANUFACTURING WATER ABSORPTION MATERIAL

(71) Applicant: DAIKI CO., LTD., Tokyo (JP)

(72) Inventor: Hiroshi Ito, Tokyo (JP)

(73) Assignee: DAIKI CO., LTD., Tokyo (JP)

(*) Notice: Subject to any disclaimer, the term of this patent is extended or adjusted under 35 U.S.C. 154(b) by 193 days.

(21) Appl. No.: 15/589,536

(22) Filed: May 8, 2017

(65) Prior Publication Data

US 2017/0239847 A1    Aug. 24, 2017

Related U.S. Application Data

(63) Continuation of application No. PCT/JP2015/067592, filed on Jun. 18, 2015.

(30) Foreign Application Priority Data

Feb. 3, 2015   (JP) .................. 2015-018957

(51) Int. Cl.
| | |
|---|---|
| B29B 17/02 | (2006.01) |
| B01J 20/26 | (2006.01) |
| B02C 18/00 | (2006.01) |
| B07B 1/20 | (2006.01) |
| B09B 3/00 | (2006.01) |
| B29B 17/04 | (2006.01) |

(52) U.S. Cl.
CPC .............. B29B 17/02 (2013.01); B01J 20/26 (2013.01); B02C 18/00 (2013.01); B07B 1/20 (2013.01); B09B 3/0075 (2013.01); B29B 17/0412 (2013.01); B07B 2220/02 (2013.01); B29B 2017/0224 (2013.01)

(58) Field of Classification Search
USPC ............................................................ 162/4
See application file for complete search history.

(56) References Cited

U.S. PATENT DOCUMENTS

| | | |
|---|---|---|
| 3,973,735 A | 8/1976 | Ito et al. |
| 2002/0079250 A1 | 6/2002 | Fahrbach et al. |
| 2014/0213159 A1 | 7/2014 | Feng |

FOREIGN PATENT DOCUMENTS

| | | |
|---|---|---|
| JP | S61-2843 U | 1/1986 |
| JP | S63-209761 A | 8/1988 |

(Continued)

OTHER PUBLICATIONS

Aug. 11, 2015 Search Report issued in International Patent Application No. PCT/JP2015/067592.

(Continued)

Primary Examiner — Jacob T Minskey
(74) Attorney, Agent, or Firm — Oliff PLC

(57) ABSTRACT

A separation device includes a first shredding unit, and a first separation unit. The first shredding unit shreds a disposable diaper (processing target) containing a plastic (first material) and a water-absorbent polymer (second material) adhering to the plastic. The first separation unit has a first tubular portion, and a first beating member. The first separation unit separates the water-absorbent polymer passing through first holes from the disposable diaper by beating the disposable diaper with a plate surface of the first beating member with the first tubular portion being rotated in a state in which the disposable diaper shredded by the first shredding unit is accommodated therein.

14 Claims, 19 Drawing Sheets

(56) References Cited

FOREIGN PATENT DOCUMENTS

| | | |
|---|---|---|
| JP | H08-117688 A | 5/1996 |
| JP | H10-191864 A | 7/1998 |
| JP | H11-235573 A | 8/1999 |
| JP | 2002-143702 A | 5/2002 |
| JP | 3118406 U | 1/2006 |
| JP | 2006-212376 A | 8/2006 |
| JP | 2008-080680 A | 4/2008 |
| JP | 2008-302270 A | 12/2008 |
| JP | 2014-091082 A | 5/2014 |
| JP | 2014-223778 A | 12/2014 |
| WO | 2014/181469 A1 | 11/2014 |

OTHER PUBLICATIONS

Aug. 11, 2015 Written Opinion issued in International Patent Application No. PCT/JP2015/067592.
Jan. 31, 2017 Office Action issued in Japanese Patent Application No. 2015-018957.
Jun. 12, 2018 Search Report issued in European Patent Application No. 15881139.

SEPARATION DEVICE AND METHOD FOR MANUFACTURING WATER ABSORPTION MATERIAL

CROSS REFERENCE TO RELATED APPLICATION

This is a Continuation of International Application No. PCT/JP2015/067592 filed Jun. 18, 2015, which claims the benefit of Japanese Application No. 2015-018957 filed Feb. 3, 2015. The contents of these applications are hereby incorporated by reference in their entirety.

TECHNICAL FIELD

The present invention relates to a separation device and a method for manufacturing a water absorption material using the separation device.

BACKGROUND ART

An example of conventional separation devices is disclosed in Patent Document 1. In the separation device disclosed in this document, first, a defective disposable diaper or the like in which a water-absorbent member is filled in an exterior material is cut into pieces of a predetermined size by a cutter. Then, the cut pieces are fed into a separator by pneumatic conveyance.

The separator has a rotational shaft that is provided so as to be rotatable about its axis and a cylindrical mesh unit that surrounds the rotational shaft and that is provided so as to be rotatable concentrically with the rotational shaft in an opposite direction. The rotational shaft is provided with a plurality of stirring rods that are disposed radially. The cut pieces that are fed into this separator are divided into the exterior material and the water-absorbent member by the rotational axis and the cylindrical mesh unit rotating in mutually opposite directions. The water-absorbent member is sifted out by meshes of the cylindrical mesh unit.

CITATION LIST

Patent Documents

Patent Document 1: JP H8-117688A

SUMMARY OF INVENTION

Technical Problem

As described above, according to this separation device, a water-absorbent resin or the like can be separated from a defective disposable diaper or the like. However, conventional separation devices have room for improvement in terms of separation efficiency.

Solution to Problem

The present invention was made in view of the above-described problems, and it is an object thereof to provide a separation device having high separation efficiency and a method for manufacturing a water absorption material using the separation device.

A separation device according to the present invention includes a first shredding unit that shreds a processing target containing a first material and a second material adhering to the first material; and a first separation unit that separates the second material from the processing target shredded by the first shredding unit, wherein the first separation unit includes a first tubular portion in which a large number of first holes that allow the second material contained in the processing target shredded by the first shredding unit to pass through without allowing the first material to pass through are formed; and a plate-like first beating member with which the processing target shredded by the first shredding unit is beaten, the first beating member being provided in the first tubular portion, and the first separation unit separates the second material passing through the first holes from the processing target by beating the processing target with a plate surface of the first beating member with the first tubular portion being rotated in a state in which the processing target shredded by the first shredding unit is accommodated in the first tubular portion.

In this separation device, the processing target containing the first material and the second material adhering to the first material is shredded by the first shredding unit. The processing target shredded by the first shredding unit is transferred to the first separation unit. In the first separation unit, the processing target is beaten with a plate surface of the first beating member with the first tubular portion being rotated, and thus the second material dissociated from the first material is discharged to the outside of the first tubular portion through the first holes. As a result, the second material is separated from the processing target.

In this manner, in the separation device according to the present invention, beating with the first beating member is performed in the first tubular portion. The beating promotes the dissociation of the second material from the first material. Thus, in the first separation unit, the second material is easily separated from the processing target, and therefore the separation efficiency is improved. Here, the separation efficiency refers to the ratio of the weight of the second material that is separated from the processing target to the weight of the second material that is contained in the processing target immediately before the processing.

Advantageous Effects of Invention

According to the present invention, a separation device having high separation efficiency and a method for manufacturing a water absorption material using the separation device are realized.

DESCRIPTION OF EMBODIMENTS

Figure 1:
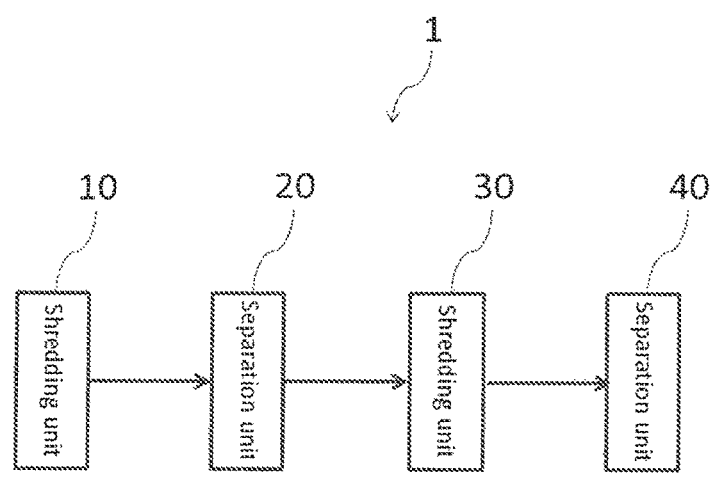
FIG. 1 is a configuration diagram showing an embodiment of a separation device according to the present invention.

Hereinafter, embodiments of the present invention will be described in detail with reference to the drawings. It should be noted that the description of the drawings denotes like elements by like reference numerals and omits redundant descriptions.

FIG. 1 is a configuration diagram showing an embodiment of a separation device according to the present invention. A separation device 1 processes a processing target containing a first material and a second material adhering to the first material, thereby dissociating the second material from the first material and separating the second material from the processing target. The processing target may be a hygiene product deemed as being defective. Examples of the hygiene product include a disposable diaper, a sanitary napkin, and a urine absorbing pad. The present embodiment will be described using a case where the processing target is a disposable diaper, the first material is a plastic, and the second material is a water-absorbent polymer (including a highly water-absorbent polymer) as an example.

The separation device 1 includes a shredding unit 10 (first shredding unit), a separation unit 20 (first separation unit), a shredding unit 30 (second shredding unit), and a separation unit 40 (second separation unit).

The shredding unit 10 shreds a disposable diaper containing a plastic and a water-absorbent polymer adhering to the plastic into fragments. For example, a crusher or a grinder can be used as the shredding unit 10. A screen is provided in the shredding unit 10. The hole diameter of the screen may be between 50 mm and 100 mm inclusive, for example.

Figure 2:
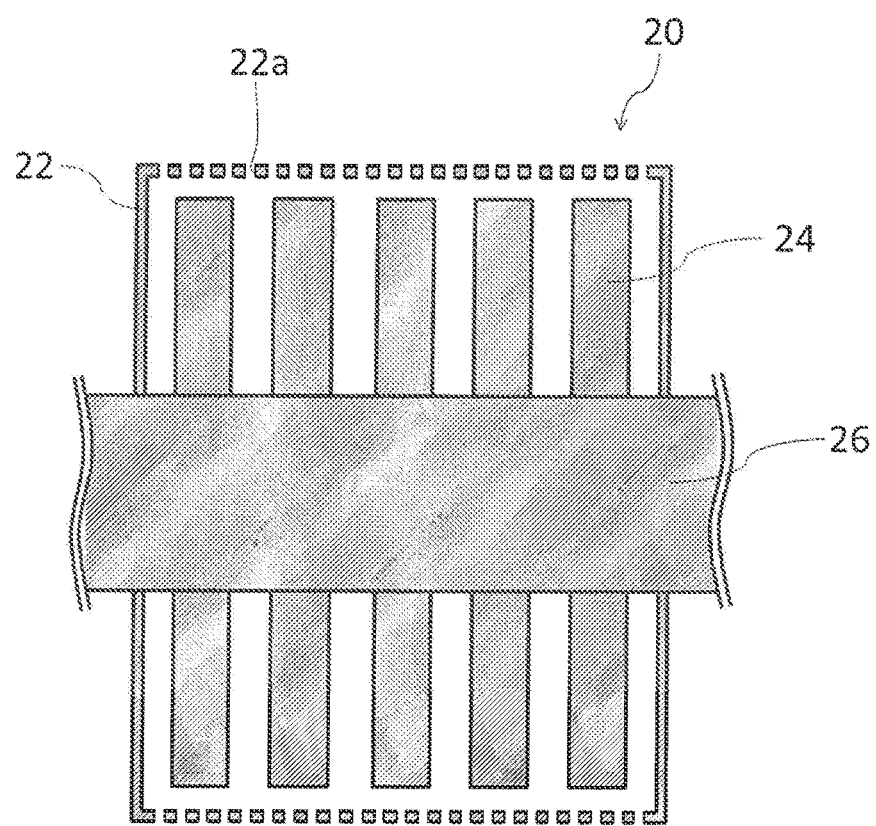
FIG. 2 is a cross-sectional view showing a separation unit 20 of the separation device in FIG. 1.
Figure 3:
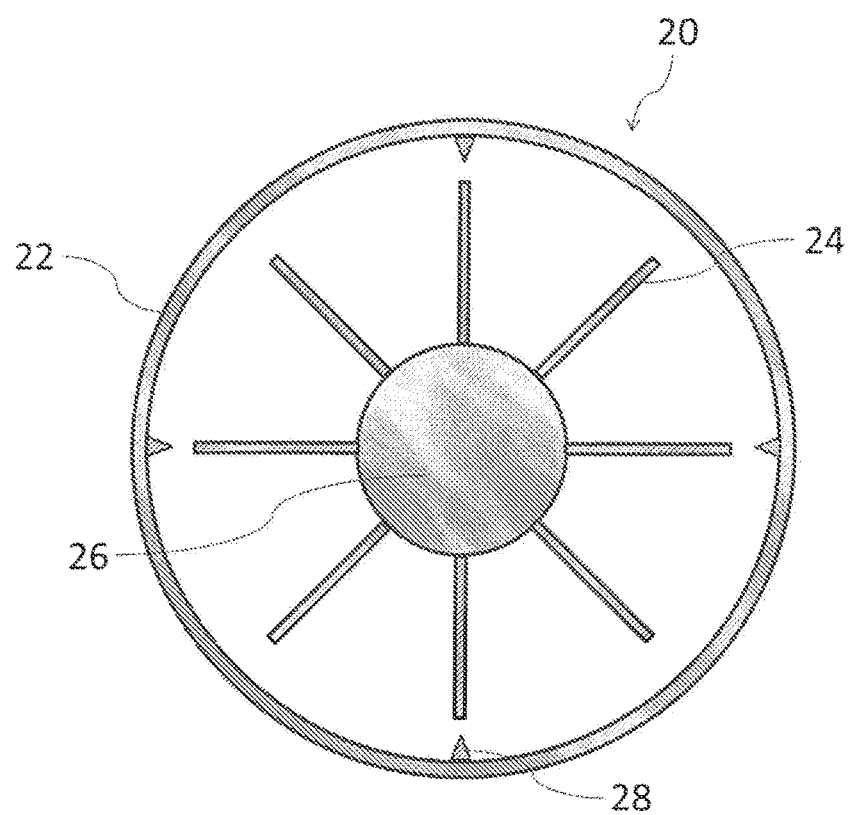
FIG. 3 is a cross-sectional view showing the separation unit 20 of the separation device in FIG. 1.

The structure of the separation unit 20 will be described with reference to FIGS. 2 to 4. FIGS. 2 and 3 are cross-sectional views showing the separation unit 20. The separation unit 20 separates the water-absorbent polymer from the disposable diaper fragments shredded by the shredding unit 10. The separation unit 20 has a drum 22 (first tubular portion), a beating member 24 (first beating member), and a rotational shaft 26 (first rotational shaft).

The drum 22 has a substantially cylindrical tubular shape and is provided so as to enclose the beating member 24 and the rotational shaft 26. The drum 22 is rotatable about its central axis. The central axis of the drum 22 extends horizontally. The drum 22 is configured to accommodate the disposable diaper fragments shredded by the shredding unit 10. The inner diameter of the drum 22 may be between 30 cm and 50 cm inclusive, for example.

Figure 4:
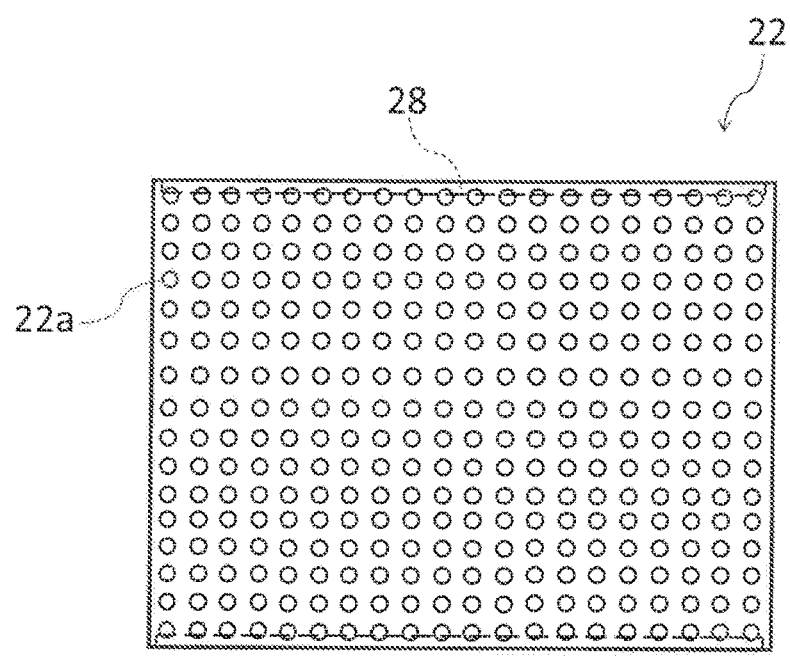
FIG. 4 is a side view showing a drum 22 provided in the separation unit 20.

FIG. 4 is a side view showing the drum 22. A large number of holes 22a (first holes) are formed in the drum 22. The holes 22a are formed over substantially the entire drum 22. The holes 22a do not allow the plastic contained in the disposable diaper fragments shredded by the shredding unit 10 to pass through, but allow the water-absorbent polymer to pass through. The diameter of the holes 22a may be between 10 mm and 30 mm inclusive, for example.

The beating member 24 is provided in the drum 22. The beating member 24 beats the disposable diaper fragments shredded by the shredding unit 10. Specifically, the beating member 24 has a plate-like shape and beats the disposable diaper fragments with its plate surface.

The rotational shaft 26 has a substantially cylindrical shape and is provided so as to be rotatable about its central axis. The central axis of the rotational shaft 26 extends horizontally. FIGS. 2 and 3 show cross sections that are parallel and perpendicular, respectively, to the central axis. However, FIG. 3 shows a cross section in which the holes 22a are not included. The central axis of the rotational shaft 26 coincides with the central axis of the drum 22. That is, the drum 22 and the rotational shaft 26 have the same central axis. However, the rotating rod 26 rotates independently of the drum 22. In the present embodiment, the drum 22 and the rotating rod 26 rotate about the central axis in mutually opposite directions.

The above-described beating member 24 is attached to the circumference of the rotational shaft 26. In the present embodiment, a plurality of beating members 24 are provided. As can be seen from FIG. 2, the beating members 24 are provided at a plurality of positions (five positions in the present embodiment) along the central axis of the rotational shaft 26. Moreover, as can be seen from FIG. 3, at each of those positions, a plurality of (eight, in the present embodiment) beating members 24 are radially attached to the circumference of the rotational shaft 26. Each beating member 24 is disposed with its thickness direction extending orthogonally to the central axis. The outer diameter of the rotational shaft 26 may be between 15 cm and 25 cm inclusive, for example. Moreover, the distance from an inner circumferential surface of the drum 22 to a leading end of each beating member 24 may be between 10 mm and 30 mm inclusive, for example.

In the separation unit 20, the disposable diaper fragments are repeatedly beaten with the beating members 24 rotating together with the rotational shaft 26 by rotating the drum 22 and the rotational shaft 26 in a state in which the disposable diaper fragments shredded by the shredding unit 10 are accommodated in the drum 22. Then, the hitting force and the like generated by the beating promote dissociation of the water-absorbent polymer from the plastic. The water-absorbent polymer dissociated from the plastic is discharged to the outside of the drum 22 through the holes 22a. Thus, the water-absorbent polymer is separated from the disposable diaper fragments. In this manner, the separation unit 20 separates the water-absorbent polymer passing through the holes 22a from the disposable diaper fragments by beating the disposable diaper fragments with the plate surfaces of the beating members 24 with the drum 22 being rotated in a state in which the disposable diaper fragments shredded by the shredding unit 10 in the drum 22.

A ridge 28 (first ridge) is formed on an inner circumferential surface of the drum 22. The ridge 28 extends in a direction in which the central axis of the drum 22 extends. As can be seen from FIG. 4, the ridge 28 extends over substantially the entire drum 22 along the direction in which the central axis of the drum 22 extends. Also, the ridge 28 has a substantially triangular cross-sectional shape (see FIG. 3). The height of the ridge 28 (length in a radial direction of the drum 22) may be between 5 mm and 20 mm inclusive, for example. Preferably, "p" (p: an integer between 3 and 5 inclusive) ridges 28 are provided. The "p" ridges 28 are arranged on the inner circumferential surface of the drum 22 at regular intervals. That is to say, in a cross section (cross section shown in FIG. 3) that is perpendicular to the central axis of the drum 22, an angle α that is formed by a line connecting one ridge 28 to the central axis and a line connecting the next ridge 28 to the central axis is substantially equal to 360°/p. In the present embodiment, p=4 and α=90°.

The shredding unit 30 shreds the disposable diaper fragments from which the water-absorbent polymer passing through the holes 22a has been separated by the separation unit 20. For example, a crusher or a grinder can be used as the shredding unit 30. A screen is provided in the shredding unit 30. The hole diameter of the screen may be between 10 mm and 50 mm inclusive, for example.

Figure 5:
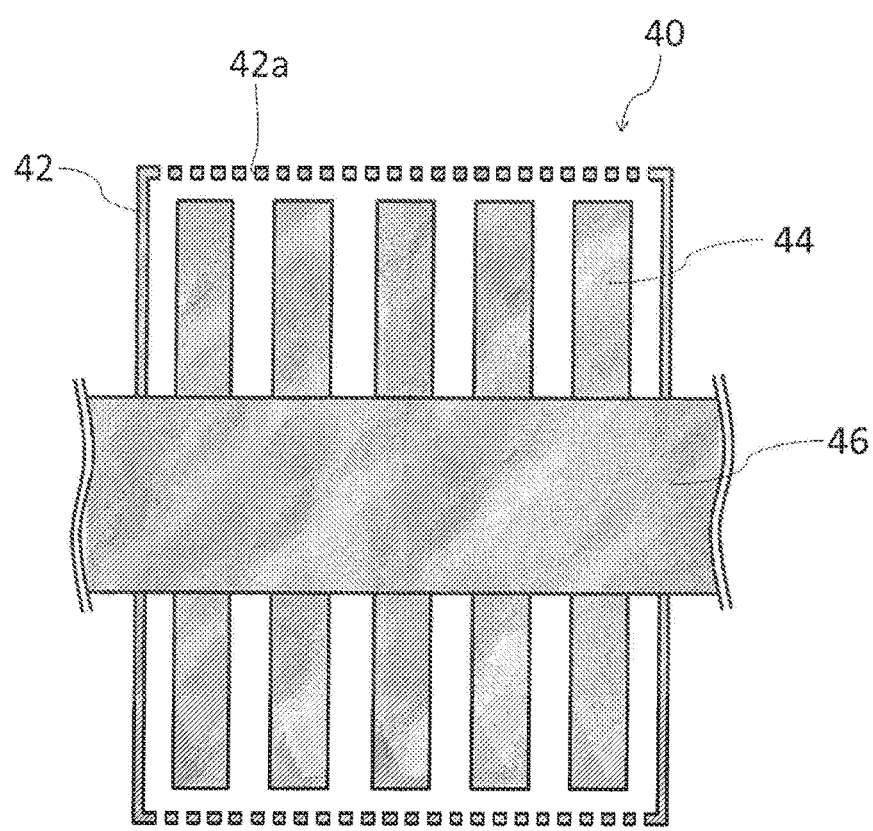
FIG. 5 is a cross-sectional view showing a separation unit 40 of the separation device in FIG. 1.
Figure 6:
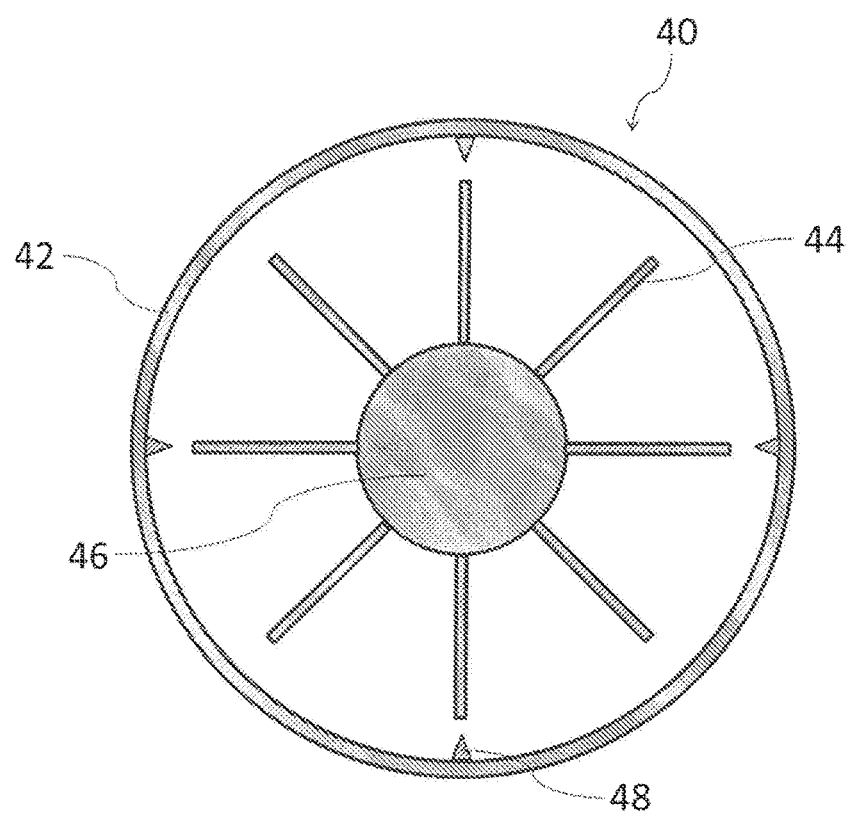
FIG. 6 is a cross-sectional view showing the separation unit 40 of the separation device in FIG. 1.

The structure of the separation unit 40 will be described with reference to FIGS. 5 to 7. FIGS. 5 and 6 are cross-sectional views showing the separation unit 40. The separation unit 40 separates the water-absorbent polymer from the disposable diaper fragments shredded by the shredding unit 30. The separation unit 40 has a drum 42 (second tubular portion), a beating member 44 (second beating member), and a rotational shaft 46 (second rotational shaft).

The drum 42 has a substantially cylindrical tubular shape and is provided so as to enclose the beating member 44 and the rotational shaft 46. The drum 42 is rotatable about its central axis. The central axis of the drum 42 extends horizontally. The drum 42 is configured to accommodate the disposable diaper fragments shredded by the shredding unit 30. The inner diameter of the drum 42 may be between 30 cm and 50 cm inclusive, for example.

Figure 7:
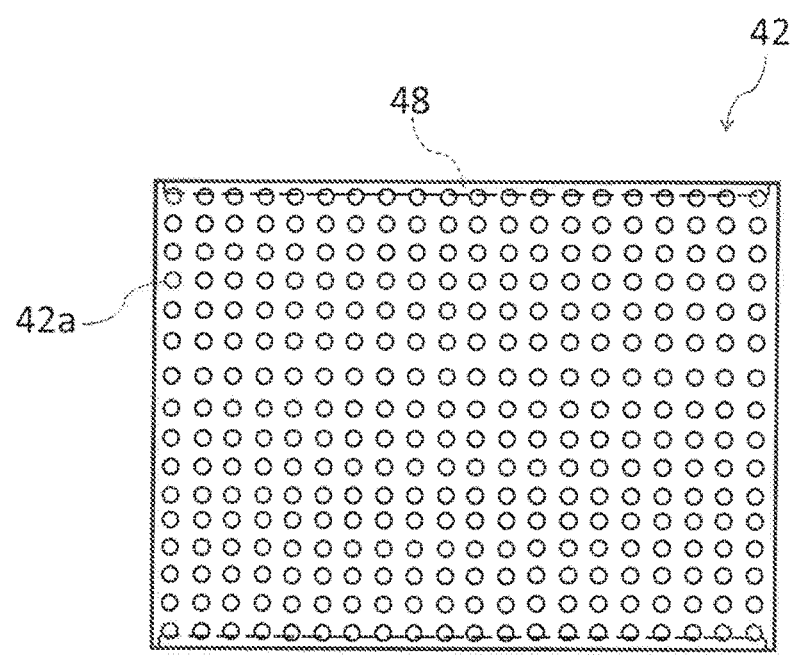
FIG. 7 is a side view showing a drum 42 provided in the separation unit 40.

FIG. 7 is a side view showing the drum 42. A large number of holes 42a (second holes) are formed in the drum 42. The holes 42a are formed over substantially the entire drum 42. The holes 42a do not allow the plastic contained in the disposable diaper fragments shredded by the shredding unit 30 to pass through, but allow the water-absorbent polymer to pass through. The area of the holes 42a in a plan view is smaller than the area of the holes 22a in a plan view. The diameter of the holes 42a may be between 5 mm and 10 mm inclusive, for example.

The beating member 44 is provided in the drum 42. The beating member 44 beats the disposable diaper fragments shredded by the shredding unit 30. Specifically, the beating member 44 has a plate-like shape and beats the disposable diaper fragments with its plate surface.

The rotational shaft 46 has a substantially cylindrical shape and is provided so as to be rotatable about its central axis. The central axis of the rotational shaft 46 extends horizontally. FIGS. 5 and 6 show cross sections that are parallel and perpendicular, respectively, to the central axis. However, FIG. 6 shows a cross section in which the holes 42a are not included. The central axis of the rotational shaft 46 coincides with the central axis of the drum 42. That is, the drum 42 and the rotational shaft 46 have the same central axis. However, the rotating rod 46 rotates independently of the drum 42. In the present embodiment, the drum 42 and the rotating rod 46 rotate about the central axis in mutually opposite directions.

The above-described beating member 44 is attached to the circumference of the rotational shaft 46. In the present embodiment, a plurality of beating members 44 are provided. As can be seen from FIG. 5, the beating members 44 are provided at a plurality of positions (five positions in the present embodiment) along the central axis of the rotational shaft 46. Moreover, as can be seen from FIG. 6, at each of those positions, a plurality of (eight, in the present embodiment) beating members 44 are radially attached to the circumference of the rotational shaft 46. Each beating member 44 is disposed with its thickness direction extending orthogonally to the central axis. The outer diameter of the rotational shaft 46 may be between 15 cm and 25 cm inclusive, for example. Moreover, the distance from an inner circumferential surface of the drum 42 to a leading end of each beating member 44 is smaller than the above-described distance from the inner circumferential surface of the drum 22 to the leading end of each beating member 24, and may be between 5 mm and 15 mm inclusive, for example.

In the separation unit 40, the disposable diaper fragments are repeatedly beaten with the beating members 44 rotating together with the rotational shaft 46 by rotating the drum 42 and the rotational shaft 46 in a state in which the disposable diaper fragments shredded by the shredding unit 30 are accommodated in the drum 42. Then, the hitting force and the like generated by the beating promote dissociation of the water-absorbent polymer from the plastic. The water-absorbent polymer dissociated from the plastic is discharged to the outside of the drum 42 through the holes 42a. Thus, the water-absorbent polymer is separated from the disposable diaper fragments. In this manner, the separation unit 40 separates the water-absorbent polymer passing through the holes 42a from the disposable diaper fragments by beating the disposable diaper fragments with the plate surfaces of the beating members 44 with the drum 42 being rotated in a state in which the disposable diaper fragments shredded by the shredding unit 30 in the drum 42.

A ridge 48 (second ridge) is formed on an inner circumferential surface of the drum 42. The ridge 48 extends in a direction in which the central axis of the drum 42 extends. As can be seen from FIG. 7, the ridge 48 extends over substantially the entire drum 42 along the direction in which the central axis of the drum 42 extends. Also, the ridge 48 has a substantially triangular cross-sectional shape (see FIG. 6). The height of the ridge 48 (length in a radial direction of the drum 42) is smaller than the above-described height of the ridge 28, and may be between 3 mm and 10 mm inclusive, for example. Preferably, "q" (q: an integer between 3 and 5 inclusive) ridges 48 are provided. The "q" ridges 48 are arranged on the inner circumferential surface of the drum 42 at regular intervals. That is to say, in a cross section (cross section shown in FIG. 6) that is perpendicular to the central axis the drum 42, an angle β that is formed by a line connecting one ridge 48 to the central axis and a line connecting the next ridge 48 to the central axis is substantially equal to 360°/q. In the present embodiment, q=4 and β=90°.

Next, the operation of the separation device 1 will be described. A disposable diaper, which is a processing target, is first shredded by the shredding unit 10 into fragments. The disposable diaper fragments shredded by the shredding unit 10 are transferred to the separation unit 20. For example, a belt conveyor or a screw conveyor can be used for the transfer. The disposable diaper fragments transferred to the separation unit 20 are accommodated in the rotating drum 22 and, in this state, beaten by the beating members 24. Then, due to the hitting force generated by the beating of the beating members 24, the centrifugal force generated by the rotation of the drum 22 and the like, the water-absorbent polymer is dissociated from the plastic. The water-absorbent polymer dissociated from the plastic is discharged to the outside of the drum 22 through the holes 22*a*. Thus, a portion of the water-absorbent polymer is separated from the disposable diaper fragments. It should be noted that in the case where the processing target is a disposable diaper as in the present embodiment, fluff pulp is also separated together with the water-absorbent polymer.

The disposable diaper fragments after separation by the separation unit 20 are transferred to the shredding unit 30 and are further shredded. The disposable diaper fragments shredded by the shredding unit 30 are transferred to the separation unit 40. The disposable diaper fragments transferred to the separation unit 40 are accommodated in the rotating drum 42 and, in this state, beaten by the beating members 44. Then, due to the hitting force generated by the beating of the beating members 44, the centrifugal force generated by the rotation of the drum 42 and the like, the water-absorbent polymer is dissociated from the plastic. The water-absorbent polymer dissociated from the plastic is discharged to the outside of the drum 42 through the holes 42*a*. Thus, the remaining water-absorbent polymer is separated from the disposable diaper fragments.

Figure 8:
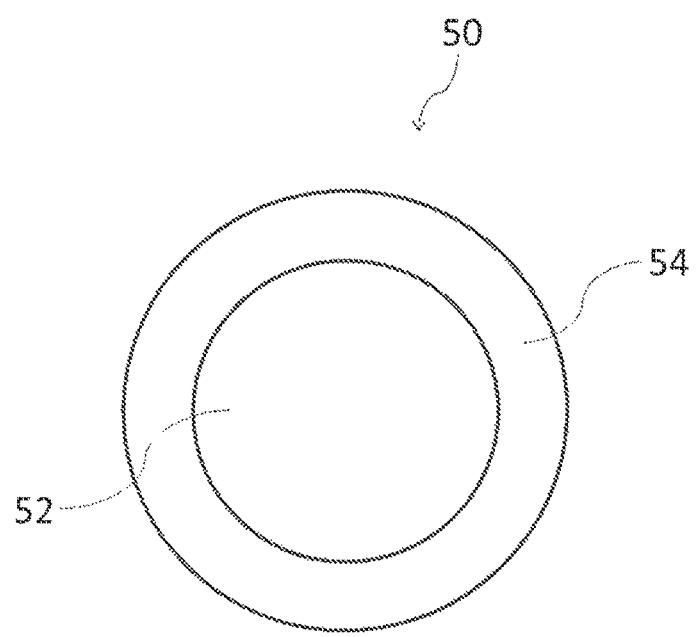
FIG. 8 schematically shows an embodiment of a water absorption material according to the present invention.

FIG. 8 schematically shows an embodiment of a water absorption material according to the present invention. A water absorption material 50 is a water absorption material that absorbs a liquid, and includes a granular core portion 52 (granulated matter) and a coating layer portion 54. The water absorption material 50 may be, for example, an excrement disposal material for pets such as cats and dogs.

The granular core portion 52 is is formed to be granular in form. Examples of the shape of the granular core portion 52 include a sphere, an ellipse, and a cylinder. The granular core portion 52 has the function of absorbing and retaining a liquid such as urine. The plastic obtained from a disposable diaper using the above-described separation device 1 (i.e., plastic from which the water-absorbent polymer and the fluff pulp have been separated) is used as the material for the granular core portion 52. The granular core portion 52 may be composed only of plastic or may be composed so as to also contain a material other than plastic.

The granular core portion 52 is coated with the coating layer portion 54. The entire surface of the granular core portion 52 may be coated with the coating layer portion 54, or only a portion of the surface of the granular core portion 52 may be coated with the coating layer portion 54. The coating layer portion 54 has the function of causing members of the water absorption material 50 that have absorbed a liquid such as urine to adhere to each other and to form clumps. For example, paper powder and a water-absorbent polymer can be used as the materials (coating material) for the coating layer portion 54.

Next, an example of a method for manufacturing the water absorption material 50 will be described as an embodiment of the method for manufacturing a water absorption material according to the present invention. This manufacturing method includes a separation step, a granulation step, a coating step, a sizing step, and a drying step. In the separation step, the plastic and the water-absorbent polymer contained in the disposable diaper are separated using the separation device 1.

In the granulation step, a material to be granulated containing the plastic obtained in the separation step is granulated. For example, an extrusion granulator can be used for granulation. At this time, water may be added to the material to be granulated prior to granulation, if necessary. Thus, the granular core portion 52 is obtained.

In the coating step, a coating material is deposited on the surface of the granular core portion 52 formed in the granulation step. Preferably, the coating material contains the water-absorbent polymer obtained in the separation step. The deposition of the coating material can be performed through sprinkling or spraying using a coater, for example. Thus, the coating layer portion 54 is obtained.

In the sizing step, the water absorption material manufactured through the prior steps is caused to pass through a sieve having a predetermined mesh size. Thus, only a portion of the water absorption material that satisfies a predetermined standard is extracted.

In the drying step, the water absorption material extracted in the previous step is dried in a dryer. The percentage of moisture content in the granular core portion 52 is adjusted as appropriate through drying. Thus, the transition of the moisture content in the granular core portion 52 to the coating layer portion 54 and a resultant decrease in water absorption capacity can be prevented, and also the occurrence of mold and the like during storage of the water absorption material 50 can be prevented.

Effects of the present embodiment will be described below. According to the present embodiment, beating with the beating member 24 is performed in the drum 22. The beating promotes the dissociation of the water-absorbent polymer from the plastic. That is, in the separation unit 20, combination of the hitting force generated by the beating of the beating member 24, the centrifugal force generated by the rotation of the drum 22 and the like dissociates the water-absorbent polymer from the plastic. Thus, the water-absorbent polymer is easily separated from the disposable diaper fragments, and therefore the separation efficiency is improved.

The separation device 1 having excellent separation efficiency as described above is particularly useful in cases where the processing target is a hygiene product such as a disposable diaper as in the present embodiment. The reason for this is that, in such a hygiene product, which has a structure in which a particulate water-absorbent polymer adheres to a sheet-like plastic, it is difficult to separate the water-absorbent polymer, and as such a sufficient separation efficiency has not been achieved by conventional separation devices.

With regard to the separation unit 20, the beating members 24 each have a plate-like shape and are configured to beat the disposable diaper fragments with their plate surfaces. A strong hitting force can be applied to the disposable diaper fragments by beating the disposable diaper with the plate surfaces of the beating members 24 in this manner. Moreover, such configuration also brings about an advantage that the disposable diaper, which is the processing target, is unlikely to get caught in the beating members 24. In contrast, in the case where a beating member has not a plate-like shape but a rod-like shape, there is a problem that the processing target gets caught in the beating member.

The beating members 24 are attached to the circumference of the rotational shaft 26. With this configuration, the heating members 24 can be rotated together with the rotational shaft 26. Thus, beating of the disposable diaper fragments with the beating members 24 can be efficiently performed.

The plurality of beating members 24 radially attached to the circumference of the rotational shaft 26 are provided in the separation unit 20. Thus, while the rotational shaft 26 makes one rotation, the disposable diaper fragments are beaten with the plurality of beating members 24, and thus beating of the disposable diaper fragments by the beating members 24 can be performed even more efficiently.

In the separation unit 20, the drum 22 is provided so as to enclose the beating members 24 and the rotational shaft 26. Therefore, a portion of the disposable diaper fragments beaten by the beating members 24 is rubbed against the inner circumferential surface of the drum 22. Thus, in the separation unit 20, not only the hitting force that acts on the disposable diaper fragments during beating by the beating members 24, but also a frictional force that acts on the disposable diaper fragments while they are being rubbed against the inner circumferential surface of the drum 22 contributes to the dissociation of the water-absorbent polymer from the plastic. Moreover, a portion of the disposable diaper fragments is flung by the beating members 24 and strikes the inner circumferential surface and the like of the drum 22. The impact force that acts on the disposable diaper fragments at this time also contributes to the dissociation of the water-absorbent polymer from the plastic.

The drum 22 and the rotational shaft 26 are configured to rotate about the same central axis in mutually opposite directions. Thus, the force exerted on the disposable diaper fragments from the inner circumferential surface of the drum 22 increases, and accordingly dissociation of the water-absorbent polymer from the plastic is promoted even more. However, the rotation direction of the drum 22 may be the same as the rotation direction of the rotational shaft 26. In that case, it is preferable that the rotation speed of the rotational shaft 26 is greater than the rotation speed of the drum 22.

The drum 22 is provided with the ridges 28. If the ridges 28 are not provided, the disposable diaper fragments tend to collect in a lower portion of the drum 22 due to the effect of gravity. In contrast, in the present embodiment, the disposable diaper fragments in the drum 22 are scooped up by the ridges 28 and thus easily reach an upper portion of the drum 22. This scooping effect allows the disposable diaper fragments to be distributed over a wide range of the inner circumferential surface of the drum 22, so that separation by the separation unit 20 is promoted. Moreover, dissociation of the water-absorbent polymer from the plastic is promoted by the impact of the disposable diaper fragments when falling down from the upper portion of the drum 22. Furthermore, since the ridges 28 are provided, the disposable diaper fragments beaten with the beating members 24 may be rubbed against the inner circumferential surface of the drum 22 in a state in which the disposable diaper fragments are caught on the ridges 28. In that case, forces are focused, so that the frictional force that is applied to the disposable diaper fragments increases, and accordingly dissociation of the water-absorbent polymer from the plastic is promoted even more.

According to the present embodiment, after shredding by the shredding unit 10, and separation by the separation unit 20 have been performed, shredding by the shredding unit 30, and separation by the separation unit 40 are performed. Since shredding, and separation are performed twice in this manner, the separation efficiency is improved even more.

With regard to the separation unit 40, the beating members 44 each have a plate-like shape and are configured to beat the disposable diaper fragments with their plate surfaces. A strong hitting force can be applied to the disposable diaper fragments by beating the disposable diaper with the plate surfaces of the beating members 44 in this manner. Moreover, such configuration also brings about an advantage that the disposable diaper, which is the processing target, is unlikely to get caught in the beating members 44.

The beating members 44 are attached to the circumference of the rotational shaft 46. With this configuration, the beating members 44 can be rotated together with the rotational shaft 46. Thus, beating of the disposable diaper fragments with the beating members 44 can be efficiently performed.

The plurality of beating members 44 radially attached to the circumference of the rotational shaft 46 are provided in the separation unit 40. Thus, while the rotational shaft 46 makes one rotation, the disposable diaper fragments are beaten with the plurality of beating members 44, and thus beating of the disposable diaper fragments by the beating members 44 can be performed even more efficiently.

In the separation unit 40, the drum 42 is provided so as to enclose the beating members 44 and the rotational shaft 46. Therefore, a portion of the disposable diaper fragments beaten by the heating members 44 is rubbed against the inner circumferential surface of the drum 42. Thus, in the separation unit 40, not only the hitting force that acts on the disposable diaper fragments during beating by the beating members 44, but also a frictional force that acts on the disposable diaper fragments while they are being rubbed against the inner circumferential surface of the drum 42 contributes to the dissociation of the water-absorbent polymer from the plastic. Moreover, a portion of the disposable diaper fragments is flung by the beating members 44 and strikes the inner circumferential surface and the like of the drum 42. The impact force that acts on the disposable diaper fragments at this time also contributes to the dissociation of the water-absorbent polymer from the plastic.

The drum 42 and the rotational shaft 46 are configured to rotate about the same central axis in mutually opposite directions. Thus, the force exerted on the disposable diaper fragments from the inner circumferential surface of the drum 42 increases, and accordingly dissociation of the water-absorbent polymer from the plastic is promoted even more. However, the rotation direction of the drum 42 may be the same as the rotation direction of the rotational shaft 46. In that case, it is preferable that the rotation speed of the rotational shaft 46 is greater than the rotation speed of the drum 42.

The distance from the inner circumferential surface of the drum 42 to the leading end of each beating member 44 is smaller than the distance from the inner circumferential surface of the drum 22 to the leading end of each beating member 24. That is to say, in the separation unit 20, in which relatively large disposable diaper fragments are processed, the distance between the drum 22 and each beating member 24 is relatively large, whereas in the separation unit 40, in which relatively small disposable diaper fragments are processed, the distance between the drum 42 and each beating member 44 is relatively small. Setting the above-described distances in accordance with the size of the processing target in this manner makes it possible to apply an appropriate frictional force to the processing target in either separation unit. However, it is not absolutely necessary to set the distance from the inner circumferential surface of the drum 42 to the leading end of each beating member 44 to be smaller than the distance from the inner circumferential surface of the drum 22 to the leading end of each beating member 24.

The drum 42 is provided with the ridges 48. If the ridges 48 are not provided, the disposable diaper fragments tend to collect in a lower portion of the drum 42 due to the effect of gravity. In contrast, in the present embodiment, the disposable diaper fragments in the drum 42 are scooped up by the ridges 48 and thus easily reach an upper portion of the drum 42. This scooping effect allows the disposable diaper fragments to be distributed over a wide range of the inner circumferential surface of the drum 42, so that separation by the separation unit 40 is promoted. Moreover, dissociation of the water-absorbent polymer from the plastic is promoted by the impact of the disposable diaper fragments when falling down from the upper portion of the drum 42. Furthermore, since the ridges 48 are provided, the disposable diaper fragments beaten with the beating members 44 may be rubbed against the inner circumferential surface of the drum 42 in a state in which the disposable diaper fragments are caught on the ridges 48. In that case, forces are focused, so that the frictional force that is applied to the disposable diaper fragments increases, and accordingly dissociation of the water-absorbent polymer from the plastic is promoted even more.

The height of the ridges 48 is smaller than the height of the ridges 28. That is to say, in the separation unit 20, in which relatively large disposable diaper fragments are processed, the height of the ridges 28 is relatively large, whereas in the separation unit 40, in which relatively small disposable diaper fragments are processed, the height of the ridges 48 is relatively small. Setting the height of the ridges in accordance with the size of the processing target makes it possible to achieve a sufficient effect of the ridges scooping up the processing target in either separation unit. However, it is not absolutely necessary to set the height of the ridges 48 to be smaller than the height of the ridges 28.

In the water absorption material 50, the plastic obtained in the separation step is used as the material for the granular core portion 52. Thus, the cost of procuring the plastic can be reduced by effectively using defective or discarded disposable diapers. Moreover, in the separation step, the separation device 1 having excellent separation efficiency as described above is used, and thus, the ratio of impurities (water-absorbent polymer and fluff pulp that have not been separated from disposable diaper fragments) contained in the granular core portion 52 can be reduced to a low level.

In the case where the water-absorbent polymer obtained in the separation step is used as the material for the coating layer portion 54, the cost of procuring the water-absorbent polymer can be reduced by effectively using defective or discarded disposable diapers.

The present invention is not limited to the foregoing embodiments, and various modifications are conceivable. In the foregoing embodiments, an example in which shredding and separation are performed twice has been described. However, shredding and separation may also be performed only once or may also be performed three or more times.

It goes without saying that the various numerical values shown in the foregoing embodiments by way of example can be set as appropriate in accordance with] the size and the like of the processing target. For example, in the case where the processing target is a sanitary napkin or a urine absorbing pad, the hole diameter of the screen of the shredding unit 10 can be set between 30 mm and 50 mm inclusive, and the hole diameter of the screen of the shredding unit 30 can be set between 10 mm and 30 mm inclusive.

Figure 9:
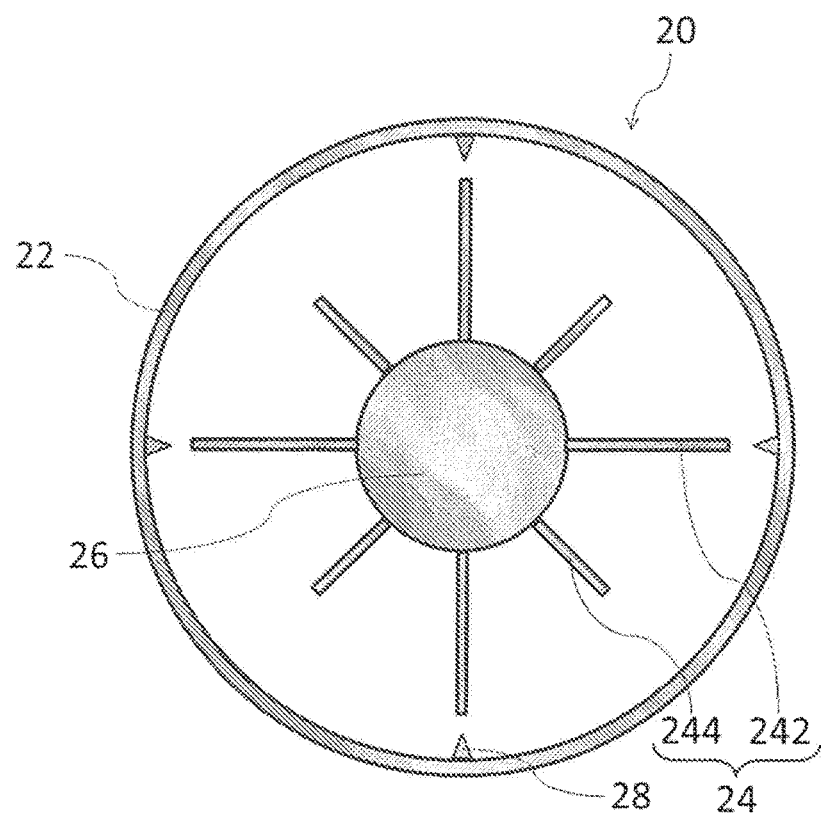
FIG. 9 is a cross-sectional view showing the separation unit 20 according to a modification.

In the foregoing embodiment, the case where all of the plurality of beating members 24 have the same lengths has been exemplified. However, it is also possible that at least two of the plurality of beating members 24 have different lengths from each other. For example, the plurality of beating members 24 may include relatively long beating members 242, and relatively short beating members 244 as shown in FIG. 9. In this example, at each of the positions along the central axis of the rotational shaft 26, the heating members 242 and the beating members 244 are alternately disposed.

Figure 10:
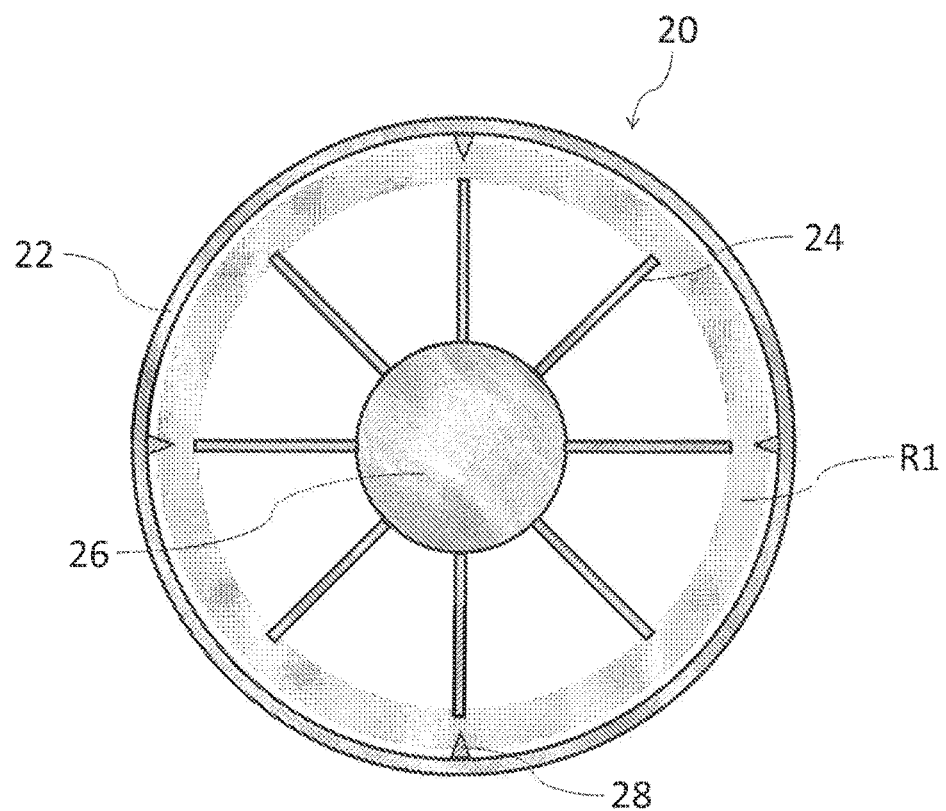
FIG. 10 is a diagram for explaining an effect of the separation unit 20 in FIG. 9.
Figure 11:
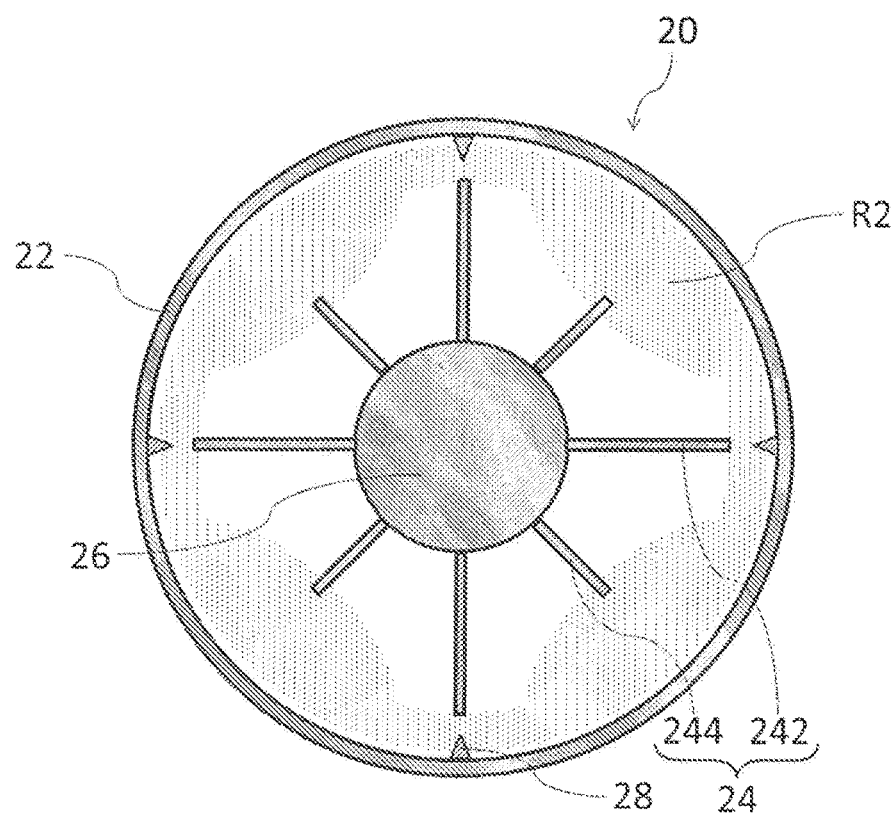
FIG. 11 is a diagram for explaining an effect of the separation unit 20 in FIG. 9.

The advantages of such configuration will be described with reference to FIGS. 10 and 11. In the case where all of the plurality of beating members 24 have the same lengths, as shown in FIG. 10, the processing target tends to concentrate in a narrow region R1 near the inner circumferential surface of the drum 22 due to wind pressure generated by the beating members 24 and the like. In contrast, in the case where the plurality of beating members 24 have different lengths, as shown in FIG. 11, the processing target can easily enter into the inside in the radial direction of the rotational shaft 26 and thus disperses over a wider region R2. Accordingly heating by the beating members 24 can be performed more efficiently. That is, while the rotational shaft 26 makes one rotation, a larger amount of the processing target can be beaten.

Figure 12:
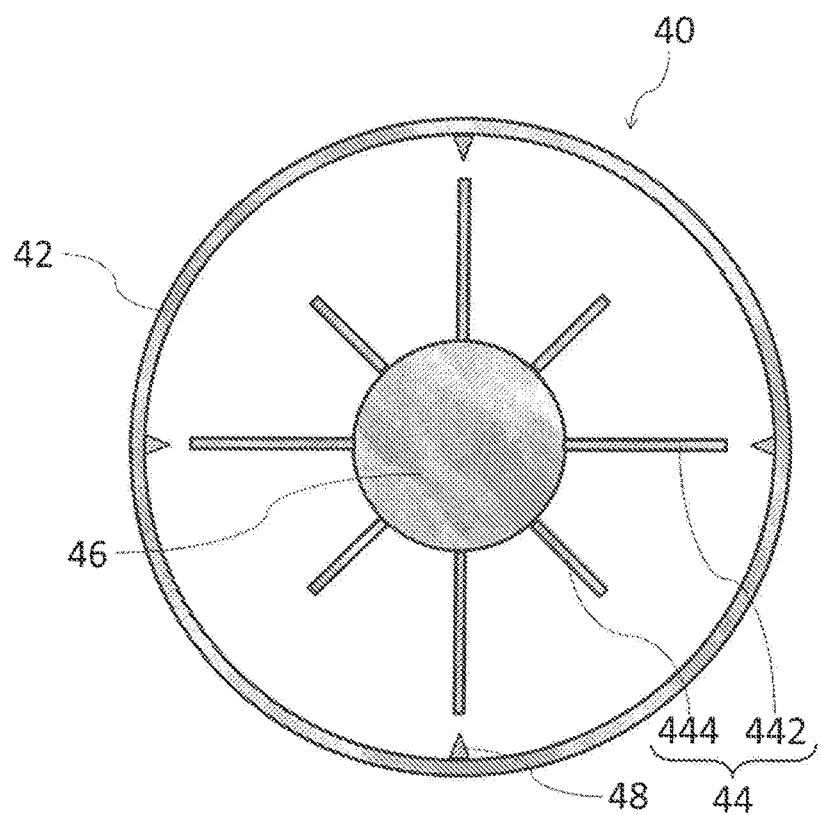
FIG. 12 is a cross-sectional view showing the separation unit 40 according to a modification.

Furthermore, in this case, the processing target can be beaten by leading end portions of the beating members 24 at a plurality of positions along the radial direction of the rotational shaft 26. Specifically the processing target can be beaten by the leading end portions of the beating members 242 at relatively outer position in the radial direction, and by the leading end portions of the beating members 244 at relatively inner position in the radial direction. In the case where the processing target is beaten by the leading end portions of the beating members 24 in this manner, the processing target collides with the corners of the leading end portions. Accordingly, beating by the leading end portions of the beating members 24 is advantageous in giving strong impact to the processing target. Similarly, the plurality of beating members 44 may include relatively long beating members 442, and relatively short beating members 444 as shown in FIG. 12.

Figure 13:
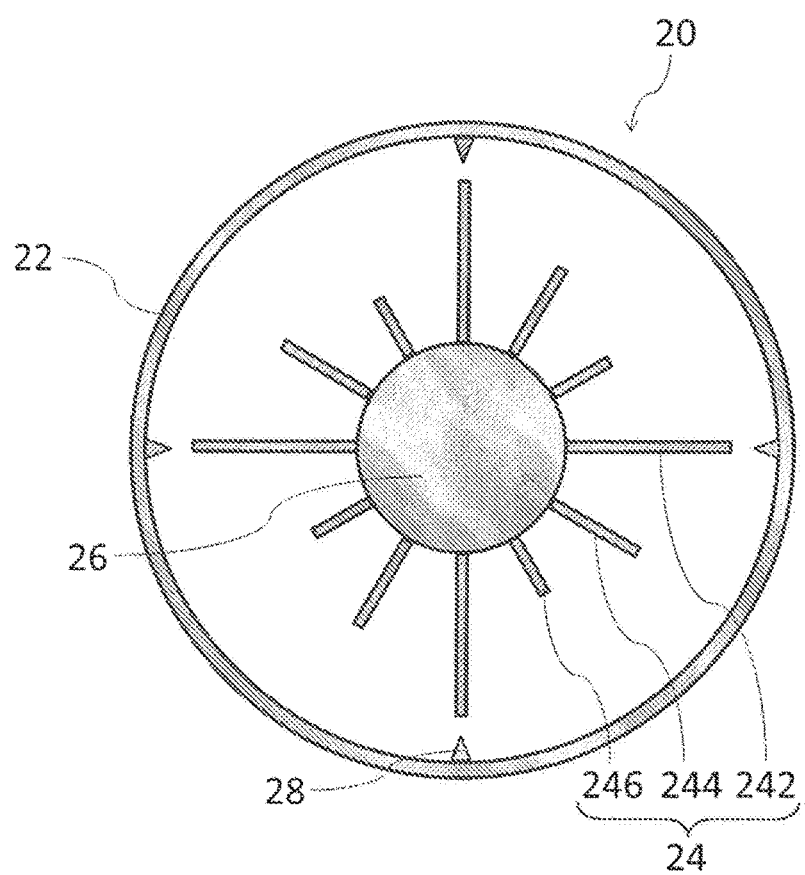
FIG. 13 is a cross-sectional view showing the separation unit 20 according to another modification.
Figure 14:
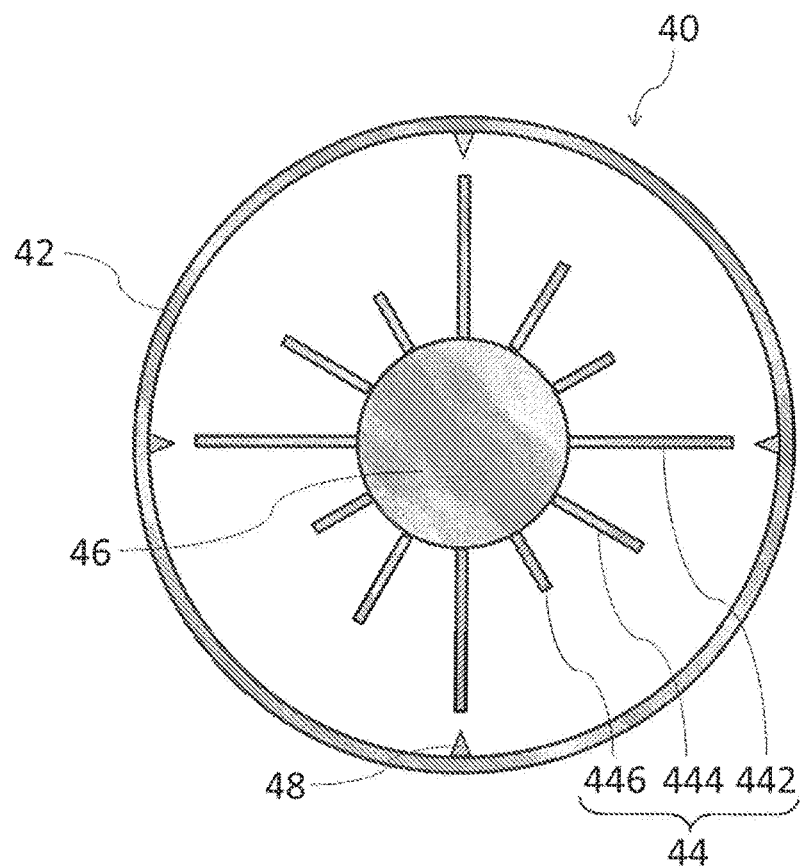
FIG. 14 is a cross-sectional view showing the separation unit 40 according to another modification.

Moreover, the plurality of beating members 24 may include three kinds of beating members that have mutually different lengths. For example, the plurality of beating members 24 may include beating members 246 that are shorter than the beating members 244, in addition to the above-described beating members 242, 244 as shown in FIG. 13. In this example, at each of the positions along the central axis of the rotational shaft 26, the beating members 242, the heating members 244 and the beating members 246 are repeatedly disposed in this order. It should be noted that the rotational shaft 26 rotates in the left-handed direction (counterclockwise) in the same figure. Similarly, the plurality of beating members 44 may include the beating members 442, the beating members 444 that are shorter than the beating members 442, and the beating members 446 that are shorter than the beating members 444 as shown in FIG. 14.

Figure 15:
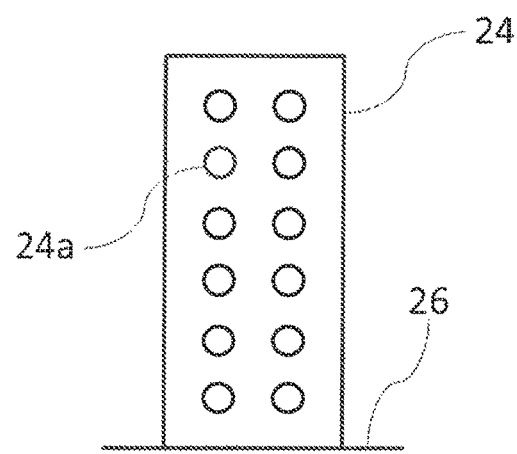
FIG. 15 is a plan view showing a beating member 24 according to a modification.
Figure 16:
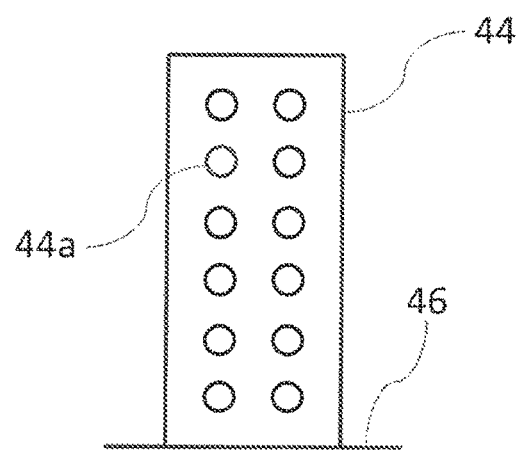
FIG. 16 is a plan view showing a beating member 44 according to a modification.

In the foregoing embodiment, an opening 24a (first opening) may also formed in the plate surface of each beating member 24 as shown in FIG. 15. In this example, a plurality of openings 24a are formed. These openings 24a are provided in order to reduce air resistance while the beating members 24 rotate. That is to say, while the beating members 24 are rotating, air passes through the openings 24a, and therefore, the air resistance acting on the beating members 24 can be reduced. Thus, power consumption of the separation unit 20 can be reduced, and wind pressure exerted on the processing target from the beating members 24 can be reduced to a low level. If high wind pressure is exerted on the processing target, the processing target is moved away from the plate surfaces of the beating members 24 before the processing target is beaten. For this reason, high wind pressure may constitute a factor that attenuates the hitting force of the heating members 24. Therefore, reducing the above-described wind pressure to a low level is preferable in exerting a strong hitting force on the processing target. It should be noted that the openings 24*a* may also be formed by forming substantially the whole or a part of each beating member 24 in a mesh form. That is to say, in this case, the meshes of each beating member 24 correspond to the openings 24*a*. A similar opening 44*a* (second opening) may also be formed in the plate surface of each beating member 44 as shown in FIG. 16.

Figure 17:
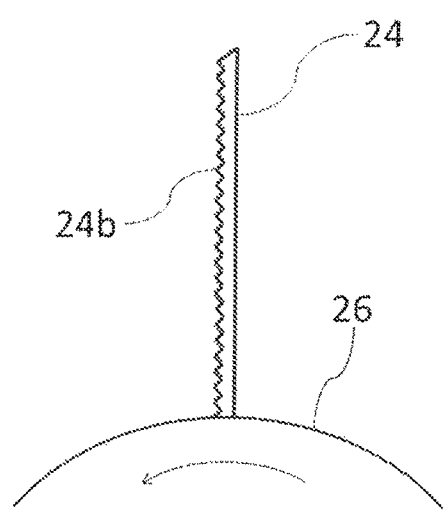
FIG. 17 is a side view showing the beating member 24 according to another modification.
Figure 18:
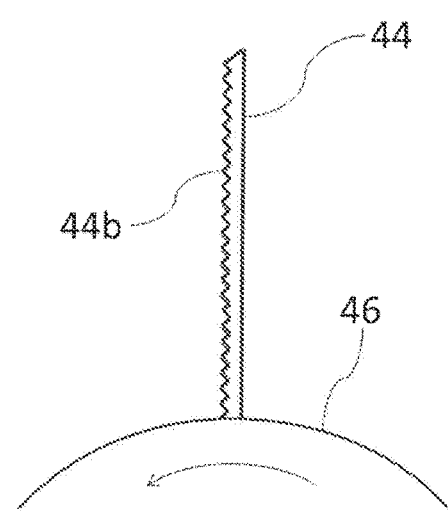
FIG. 18 is a side view showing the beating member 44 according to another modification.

In the foregoing embodiment, the plate surfaces of the beating members 24 may be uneven surfaces as shown in FIG. 17. That is to say, an uneven portion 24*b* (first uneven portion) is formed on the plate surface (surface with which the processing target is beaten) of each beating member 24. As indicated by the arrow in this diagram, the beating members 24 and the rotational shaft 26 rotate in the left-handed direction (counterclockwise). Beating the processing target with these uneven surfaces makes it possible to exert a stronger impact on the processing target than in the case where the processing target is beaten with flat surfaces. Similarly an uneven portion 44*b* (second uneven portion) may be formed on the plate surface of each beating member 44 as shown in FIG. 18.

In the foregoing embodiment, an example in which the drum 22 has a cylindrical tubular shape has been described. However, it is also possible that the drum 22 has a tapered shape. The same applies to the drum 42.

In the foregoing embodiment, an example in which the central axis of the drum. 22 extends horizontally has been described. However, it is also possible that the central axis of the drum 22 is sloped downward from the inlet side toward the outlet side. The same applies to the drum 42.

In the foregoing embodiment, an example in which the holes 22*a* are formed over substantially the entire drum 22 has been described. However, it is also possible that the holes 22*a* are formed in only a portion of the drum 22. Moreover, it is also possible that the holes 22*a* are formed by forming substantially the whole or a portion of the drum 22 in a mesh form. That is to say, in this case, the meshes of the drum 22 correspond to the holes 22*a*. The same applies to the holes 42*a*.

In the foregoing embodiment, an example in which the ridges 28 extend over substantially the entire drum 22 along the direction in which the central axis of the drum 22 extends has been described. However, it is also possible that the ridges 28 extend over only a portion of the drum 22 along the direction in which the central axis of the drum 22 extends. The same applies to the ridges 48.

Figure 19:
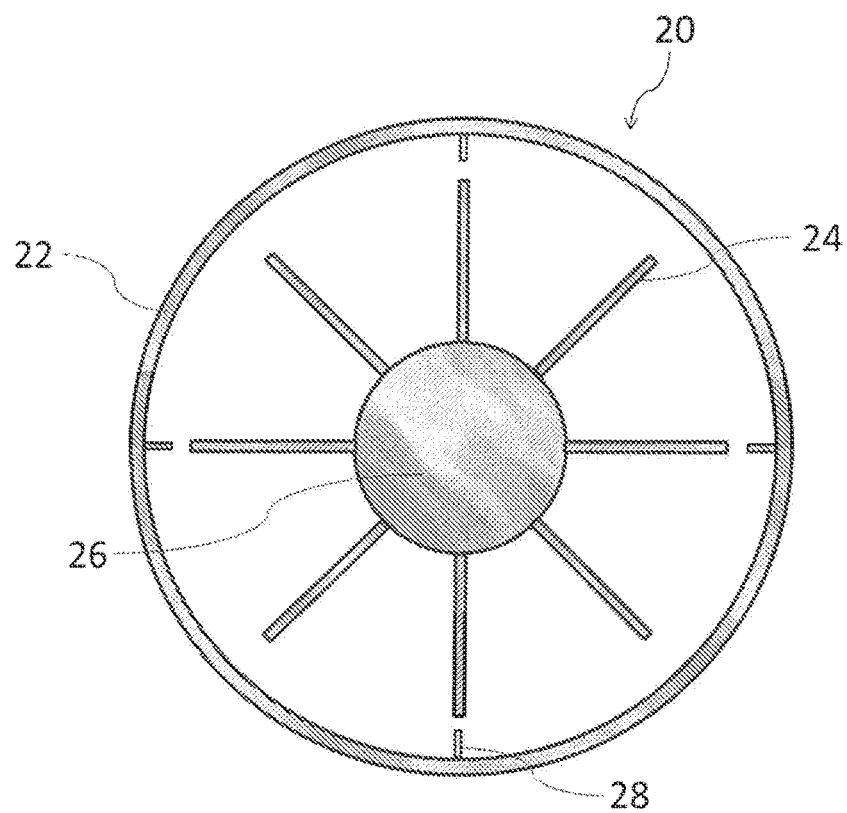
FIG. 19 is a diagram for explaining a modification of ridges 28 shown in FIG. 3.

In the foregoing embodiment, the ridges 28 having a substantially triangular cross-sectional shape have been described as an example. However, it is also possible that the ridges 28 have a flat plate-like shape as shown in FIG. 19. The same applies to the ridges 48.

In the foregoing embodiment, an example in which four ridges 28 are provided on the inner circumferential surface of the drum 22 has been described. However, the number of ridges 28 can be set at any number greater than or equal to 1. The same applies to the ridges 48.

In the foregoing embodiment, an example in which the ridges 28 are provided on the inner circumferential surface of the drum 22 has been described. However, the provision of the ridges 28 is not necessarily required. The same applies to the ridges 48.

In the foregoing embodiment, the water absorption material 50 having a multi-layer structure composed of the granular core portion 52 and the coating layer portion 54 has been described as an example. However, the provision of the coating layer portion 54 is not necessarily required. That is to say, the water absorption material 50 may also have a single layer structure composed only of the granular core portion 52.

LIST OF REFERENCE NUMERALS

1 Separation device
10 Shredding unit (first shredding unit)
20 Separation unit (first separation unit)
22 Drum (first tubular portion)
22*a* Hole (first hole)
24 Beating member (first beating member)
24*a* Opening (first opening)
24*b* Uneven portion (first uneven portion)
26 Rotational shaft (first rotational shaft)
28 Ridge (first ridge)
30 Shredding unit (second shredding unit)
40 Separation unit (second separation unit)
42 Drum (second tubular portion)
42*a* Hole (second hole)
Beating member (second beating member)
44*a* Opening (second opening)
44*b* Uneven portion (second uneven portion)
46 Rotational shaft (second rotational shaft)
48 Ridge (second ridge)
50 Water absorption material
52 Granular core portion (granulated matter)
54 Coating layer portion

The invention claimed is:

1. A separation device comprising:
a first shredding unit that shreds a processing target containing a first material and a second material adhering to the first material; and
a first separation unit that separates the second material from the processing target shredded by the first shredding unit,
wherein the first separation unit includes:
a first tubular portion in which a large number of first holes that allow the second material contained in the processing target shredded by the first shredding unit to pass through without allowing the first material to pass through are formed;
a plurality of plate-like first beating members with which the processing target shredded by the first shredding unit is beaten, the plurality of first beating members being provided in the first tubular portion; and
a first rotational shaft,
wherein the plurality of first beating members are radially attached to a circumference of the first rotational shaft at a same position along a central axis of the first rotational shaft such that a thickness direction of each of the first beating members extends orthogonally to the central axis,
wherein at least two of the plurality of first beating members have different lengths from each other, and
wherein the first separation unit separates the second material passing through the first holes from the processing target by beating the processing target with a plate surface of each of the first beating members with the first tubular portion being rotated in a state in which the processing target shredded by the first shredding unit is accommodated in the first tubular portion.

2. The separation device according to claim 1,
wherein the first tubular portion has a same central axis as the first rotational shaft, and rotates about the central axis in a direction opposite to a rotating direction of the first rotational shaft.

3. The separation device according to claim 1,
wherein a first opening is formed in the plate surface of each of the plurality of first beating members.

4. The separation device according to claim 1,
wherein a first uneven portion is formed on the plate surface of each of the plurality of first beating members.

5. The separation device according to claim 1,
wherein the first separation unit has a first ridge that is provided on an inner circumferential surface of the first tubular portion and that extends in a direction in which a central axis of the first tubular portion extends.

6. The separation device according to claim 1, further comprising:
a second shredding unit that shreds the processing target from which the second material passing through the first holes has been separated by the first separation unit;
a second separation unit that separates the second material from the processing target shredded by the second shredding unit,
wherein the second separation unit includes:
a second tubular portion in which a large number of second holes that allow the second material contained in the processing target shredded by the second shredding unit to pass through without allowing the first material to pass through are formed; and
a plate-like second beating member with which the processing target shredded by the second shredding unit is beaten, the second beating member being provided in the second tubular portion, and the second separation unit separates the second material passing through the second holes from the processing target by beating the processing target with a plate surface of the second beating member with the second tubular portion being rotated in a state in which the processing target shredded by the second shredding unit is accommodated in the second tubular portion.

7. The separation device according to claim 6,
wherein the second separation unit has a second rotational shaft, and
the second beating member is attached to a circumference of the second rotational shaft.

8. The separation device according to claim 7,
wherein the second separation unit has a plurality of said second beating members, and
the plurality of second beating members are radially attached to the circumference of the second rotational shaft.

9. The separation device according to claim 8,
wherein at least two of the plurality of second beating members have different lengths from each other.

10. The separation device according to claim 7,
wherein the second tubular portion has a same central axis as the second rotational shaft, and rotates about the central axis in a direction opposite to a rotating direction of the second rotational shaft.

11. The separation device according to claim 6,
wherein an area of the second holes in a plan view is smaller than an area of the first holes in a plan view.

12. The separation device according to claim 1,
wherein the first material is a plastic, and
the second material is a water-absorbent polymer.

13. The separation device according to claim 1,
wherein the processing target is a hygiene product.

14. The separation device according to claim 13,
wherein the processing target is a disposable diaper.

* * * * *